(12) United States Patent
Smith (10) Patent No.: US 9,723,892 B2
(45) Date of Patent: Aug. 8, 2017

(54) FOOT ALIGNMENT TOOL

(71) Applicant: Vertical Orthotics Pty Ltd, Marrickville (AU)

(72) Inventor: Neil Robert Smith, Marrickville (AU)

(73) Assignee: Vertical Orthotics Pty Ltd (AU)

( * ) Notice: Subject to any disclaimer, the term of this patent is extended or adjusted under 35 U.S.C. 154(b) by 0 days.

(21) Appl. No.: 15/137,751

(22) Filed: Apr. 25, 2016

(65) Prior Publication Data

US 2016/0235157 A1     Aug. 18, 2016

Related U.S. Application Data

(63) Continuation of application No. 13/351,061, filed on Jan. 16, 2012, now abandoned, which is a continuation-in-part of application No. PCT/AU2009/000902, filed on Jul. 16, 2009.

(30) Foreign Application Priority Data

Jul. 17, 2008     (AU) ................................ 2008903645

(51) Int. Cl.
| | |
|---|---|
| A43D 5/00 | (2006.01) |
| A43B 7/24 | (2006.01) |
| A43B 7/28 | (2006.01) |
| A43B 3/00 | (2006.01) |
| A43B 7/14 | (2006.01) |
| A43B 17/00 | (2006.01) |
| B29D 35/12 | (2010.01) |

(52) U.S. Cl.
CPC .............. *A43B 7/24* (2013.01); *A43B 3/0057* (2013.01); *A43B 7/1495* (2013.01); *A43B 7/28* (2013.01); *A43B 17/00* (2013.01); *A43D 5/00* (2013.01); *B29D 35/122* (2013.01)

(58) Field of Classification Search
CPC . A43D 5/00; A43D 5/005; A43D 5/04; A43D 999/00; A43B 7/24; A43B 7/28; A43B 7/1495; A43B 17/00; A43B 17/023
USPC .......................................................... 12/103
See application file for complete search history.

(56) References Cited

U.S. PATENT DOCUMENTS

| | | | | |
|---|---|---|---|---|
| 2,449,535 | A * | 9/1948 | Scholl ...................... | A43B 7/22 |
| | | | | 12/103 |
| 3,380,092 | A * | 4/1968 | Golczyuski ............ | A43B 13/38 |
| | | | | 12/103 |
| 4,503,576 | A * | 3/1985 | Brown ................... | A43B 7/141 |
| | | | | 12/146 M |
| 6,523,206 | B2 * | 2/2003 | Royall .................... | A43B 3/128 |
| | | | | 12/142 N |
| 7,125,509 | B1 * | 10/2006 | Smith ...................... | A43B 7/28 |
| | | | | 12/146 B |

(Continued)

*Primary Examiner* — Ted Kavanaugh
(74) *Attorney, Agent, or Firm* — Design IP (57) ABSTRACT

A foot alignment tool is configured for aligning a foot bearing a load. The tool extends between a handle at one end and a support lever at an opposing end and is characterized in that the support lever is configured to be received under or substantially under the medial longitudinal arch or the cuboid of the foot and configured to be rotated so as translate and/or rotate the foot from the inside of the foot to the outside of the foot or from the outside of the foot to the inside of the foot by a predetermined amount about a foot heel-toe axis wherein the support lever is configured to apply a predetermined torque.

16 Claims, 5 Drawing Sheets

(56) References Cited

U.S. PATENT DOCUMENTS

| | | | | |
|---|---|---|---|---|
| 7,367,074 B1* | 5/2008 | Bergquist | ............... | A43B 7/28 12/142 N |
| 2004/0102726 A1* | 5/2004 | Sullivan | ................. | A61F 5/14 602/23 |
| 2004/0194348 A1* | 10/2004 | Campbell | ............. | A43B 7/142 36/93 |
| 2007/0074430 A1* | 4/2007 | Coomer | ............... | A43B 7/141 36/145 |
| 2008/0127526 A1* | 6/2008 | Spicer | ................. | A43B 7/1495 36/145 |
| 2009/0183388 A1* | 7/2009 | Miller | ................. | A43B 7/141 36/43 |
| 2012/0159721 A1* | 6/2012 | Smith | ............... | A43B 3/0057 12/103 |

\* cited by examiner

FOOT ALIGNMENT TOOL

CROSS REFERENCE TO RELATED APPLICATIONS

This application is a continuation of U.S. application Ser. No. 13/351,061, filed on Jan. 16, 2012, which is a continuation-in-part of PCT International Application No. PCT/AU2009/000902, filed Jul. 16, 2009, which claims the benefit of Australian Patent Application No. 2008903645, filed Jul. 17, 2008, all of which are incorporated by reference as if fully set forth.

FIELD OF THE INVENTION

The present invention relates to foot orthotics and, in particular, to a foot alignment tool for use in making foot orthotics.

The invention has been developed primarily for use in aligning a foot when making a foot orthotic and/or in quantifying the pronation or supination of a foot and will be described hereinafter with reference to these applications. However, it will be appreciated that the invention is not limited to these particular uses.

BACKGROUND ART

In order to make a foot orthotic, an impression of a foot is required. There are numerous ways to take an impression of a foot for the manufacture of orthotics and the most common is to have a patient lay on their back or stomach so as to be either in the supine or prone position. A plaster bandage is then wrapped over the sole and sides of the foot and held in position whilst pushing against the fourth and fifth toes until a resistance is felt. This is considered to be the "neutral" position defined as the foot being in line with the leg and talus bone is centered between the lateral and medial malleolus. This is presumed to be the best and most functional position for the foot to be in and is maintained in that position until the plaster is dried. Once dry, the cast is removed from the foot and the process is repeated for the other foot.

In most cases it is known that there will be a difference between the forefoot to rear foot relationship in the cast. Some prior methods were employed on the basis that if the rear foot of the negative cast is balanced with the forefoot so that the rear foot is vertical this would be the best position for the foot to be in. By placing a wedge under the medial or lateral aspect of the forefoot and pouring the negative cast in this balanced position achieves this. An orthotic is made from the mould of this new balanced position that will promote the foot to sit in the same position when the feet are bearing weight on the orthotics. Unfortunately, this method is problematic in that the balanced positive model of the cast has to be balanced and modified to try and represent what the foot would look like in a corrected weight bearing position.

In its simplest form, bisection of the balanced positive model is made corresponding to the first and fifth metatarsals with nails hammered vertically into these marks until level with the top of the cast. A forefoot block is made with plaster and cut to the proximal edge of the nails. The gap created from the medial side of the forefoot block must be filled and modified with plaster which tapers off gradually to nothing when it reaches the medial cuneiform and navicular.

It will be appreciated that the height and shape of the medial longitudinal arch of a foot is very subjective in characterization and will change, depending on the particular clinician, balancing and cast modification instructions, with the clinician's individual interpretation of those instructions and the variations of the modification between technicians. The next step in the process is to add plaster to the lateral side of the cast which tapers at the back of the heel. This is done to compensate for the fatty tissue in the foot spreading when in a (corrected) weight bearing position. A nail is then added to the central side of the heel with a predetermined length, preferably between 2 mm to 8 mm depending on how much fatty tissue expansion is required. Typically, 3 to 4 mm is considered normal exposure for the nail in the central lateral side of the heel cast.

Once the nails are in position, plaster is added to the lateral side of the cast and rounded off so that there are no sharp edges. This can be done by hand or scraped back to the desired shape when the plaster has set. Unfortunately, there are many variables involved with this common process. The first major variable is that the original process of taking the cast occurs while the foot is not in a weight bearing position. It is known that there is significant variation in the rear foot bisection of a non-weight bearing cast which is not only between practitioners/clinicians but even when a single practitioner/clinician takes the same casts several times.

It is the genesis of this invention to provide a foot alignment tool that will address the disadvantages of the prior art, or to provide a useful alternative.

SUMMARY OF THE INVENTION

According to a first aspect of the invention there is provided a foot alignment tool configured for aligning a foot bearing a load, the tool extending between a handle at one end and a support lever at an opposing end, the foot alignment tool characterized in that the support lever is configured to be received under or substantially under the medial longitudinal arch of the foot and configured to be rotated so as translate and/or rotate the foot from the inside of the foot to the outside of the foot by a predetermined amount about a foot heel-toe axis wherein the support lever is configured to apply a predetermined torque.

According to another aspect of the invention there is provided a foot alignment tool configured for aligning a foot bearing a load, the tool extending between a handle at one end and a support lever at an opposing end, the foot alignment tool characterized in that the support lever is configured to be received under or substantially under the cuboid of the foot and configured to be rotated to rotate and/or translate the foot from the outside of the foot to the inside of the foot by a predetermined amount about a foot heel-toe axis, the support lever configured to apply a predetermined torque to pronate and/or stabilize the foot.

According to another aspect of the invention there is provided an apparatus configured to align a foot in the creation of a foot orthotic and for aligning a foot bearing a load, the apparatus having a support lever configured to be received under or substantially under the medial longitudinal arch or cuboid of the foot and configured to be rotated to rotate and/or translate the foot from the inside of the foot to the outside or the outside of the foot to the inside of the foot by a predetermined amount about a foot heel-toe axis, the support lever configured to apply a predetermined torque to pronate and/or stabilize the foot.

According to another aspect of the invention there is provided a mechanical foot alignment apparatus for aligning a loaded foot into a corrected position in the production of a foot orthotic, the apparatus comprising: a medial foot alignment tool extending between an outer end and a support lever at an opposing end and configured to be received substantially under the medial longitudinal arch of the foot and configured to be rotated so as to translate and/or rotate the foot from the inside of the foot to the outside of the foot by a predetermined amount about a foot heel-toe axis; and mechanical apparatus to rotate the medial foot alignment tool.

According to another aspect of the invention there is provided a mechanical foot alignment apparatus for aligning a loaded foot into a corrected position in the production of a foot orthotic, the apparatus comprising: a cuboid foot alignment tool extending between an outer end and a support lever at an opposing end and configured to support the cuboid of the foot and configured to be rotated to rotate and/or translate the foot from the outside of the foot to the inside of the foot by predetermined amount about the heel-toe foot axis to the inside of the foot, the cuboid foot alignment tool configured to apply a predetermined torque to pronate and/or stabilize the foot; and a mechanical apparatus to rotate the cuboid foot alignment tool.

According to another aspect of the invention there is provided a method of forming a corrective foot orthotic for a foot under a load, the method comprising the steps of: placing a foot on a support surface; adhering an upper and lower sheet of thermo-formable plastic material together and adhering a non-plastic sheet layer on the underside of the adhered pair of thermo-formable sheets; heating the thermo-formable plastic sheets to a predetermined temperature and disposing it intermediate the foot and the foot support surface; disposing a foot alignment tool intermediate the foot support surface and the underside of the thermo-formable sheets: under or substantially under the medial longitudinal arch and having an outer end and a support lever at an opposing end, the foot alignment tool configured to be rotated so as to translate and/or rotate the foot from the inside of the foot to the outside of the foot by predetermined amount about a foot heel-toe axis wherein the foot alignment tool is configured to apply a predetermined torque to move the foot into a corrected position; or under or substantially under the cuboid of the foot and extending between an outer end and a support lever end to be rotated to rotate and/or translate the foot to the outside of the foot to the inside of the foot by a predetermined amount about a foot heel-toe axis such that the foot alignment tool applies a predetermined torque to pronate and/or stabilize the foot to correct the foot position; removing the fitted thermo-formable plastic sheets and allowing to cool; and adhering a top sheet layer to the cooled thermo-formable plastic sheets.

It can therefore be seen that there is provided a foot alignment tool which allows the foot to be rotated toward a pronated or supinated foot position. Furthermore it will be appreciated that the foot alignment tool allows a foot orthotic to be made in which the foot is either supinated or pronated or otherwise stabilized. Furthermore, it will be appreciated the use of the foot alignment tool removes significantly all the variation in the process of the measurement or making foot orthotics known by the methods of the prior art.

BRIEF DESCRIPTION OF THE DRAWINGS

Preferred embodiments of the invention will now be described, by way of example only, with reference to the accompanying drawings in which.

DETAILED DESCRIPTION OF THE PREFERRED EMBODIMENTS

Figure 1:
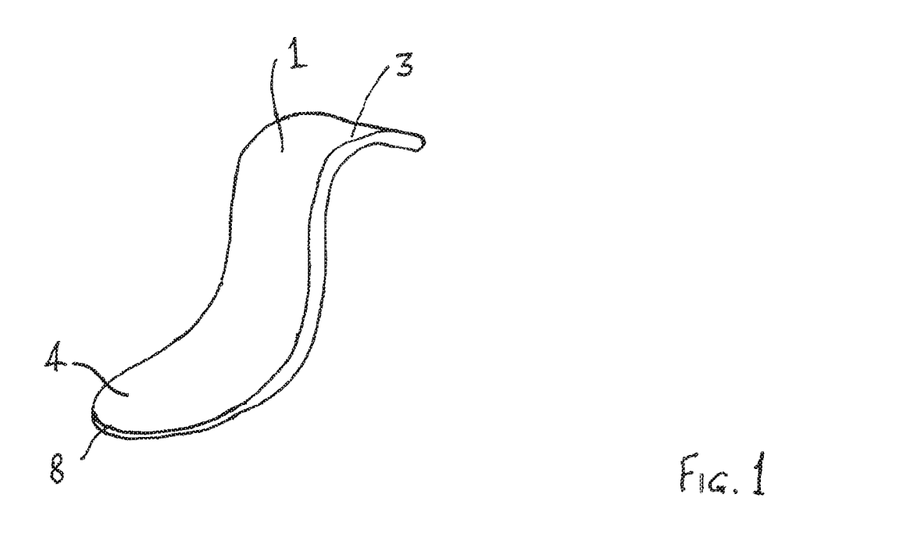
FIG. 1 is a perspective view of a foot alignment tool according to the first preferred embodiment.
Figure 2:
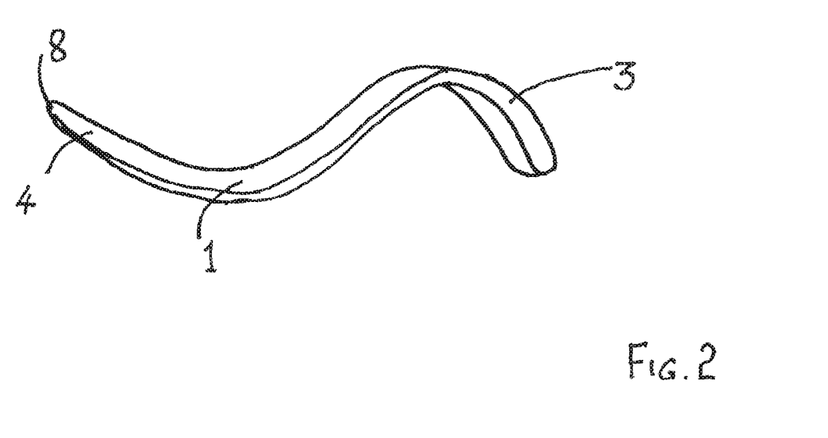
FIG. 2 is a side view of the foot alignment tool of FIG. 1.
Figure 3:
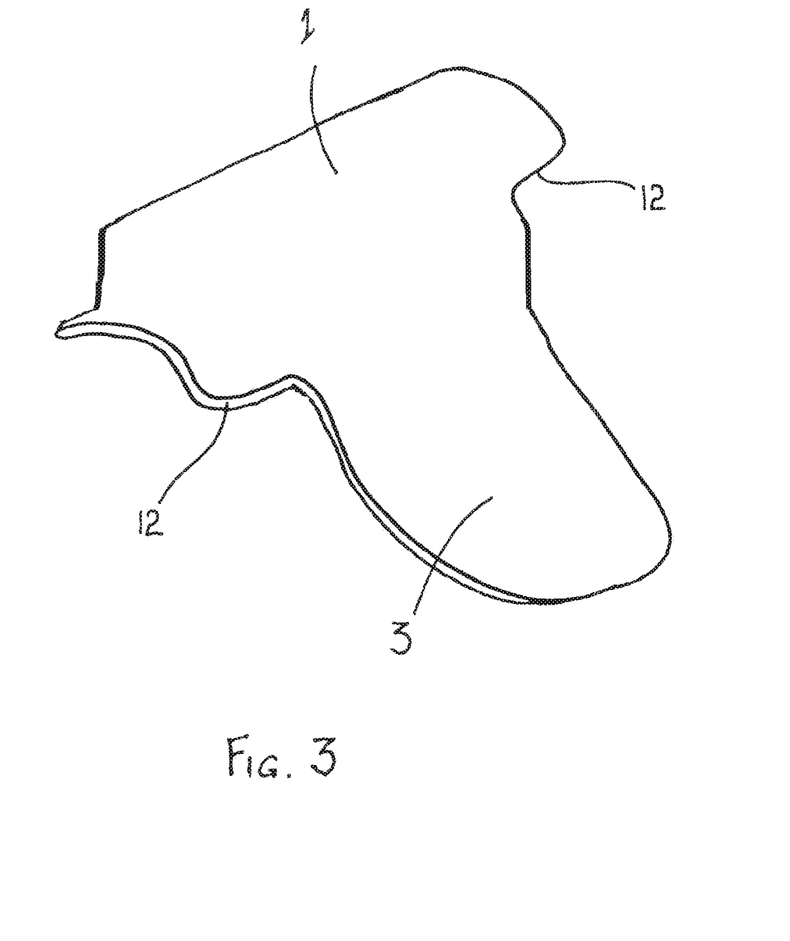
FIG. 3 is a top perspective view of a foot alignment tool according to another preferred embodiment.

It will be appreciated that throughout the description of the preferred embodiments like reference numerals have been used to denote like components. In FIGS. 1 and 2, there is shown a perspective view and a side view of a foot alignment tool 1 according to the first preferred embodiment. FIG. 3 shows a top perspective view of a foot alignment tool 1 according to another preferred embodiment.

The foot alignment tool 1 is formed from a plastics material and is configured for aligning a foot 2 (not shown in FIGS. 1 to 3) bearing a load. The tool 1 can alternatively be formed from a metal, wood or other preferred material. The foot alignment tool 1 extends between a handle 3 at one end and a support lever 4 at an opposing end.

The foot alignment tool 1 of the embodiment of FIG. 3 includes a shoulder portion 12 disposed intermediate the handle 3 and the support lever 4. It can be seen that the support lever 4 is wider than the handle 3 in this embodiment.

The support lever 4 is configured to be received under or substantially under the medial longitudinal arch 5 (not shown in FIGS. 1 to 3) of the foot 2. The support lever 4 is configured to be rotated so as to rotate and/or translate the foot from the inside of the foot 6 to the outside of the foot 7 by the application of a predetermined torque.

It will be appreciated that during rotation of the foot in response to the rotation of the foot alignment tool 1 under or substantially under the medial longitudinal arch 5 not only causes the foot to rotate from the inside of the foot to the outside of the foot but also translates the foot due to the natural motion of the foot under the force from the foot alignment tool 1. That is, a rotation of the tool 1 causes rotation and/or translation of the foot 2.

The foot alignment tool 1 allows the foot 2 to be rotated about the heel-toe axis of the foot into a supinated position, to a less pronated position or to stabilize the foot. Furthermore, the foot alignment tool 1 may rotate the foot about the foot heel-toe axis to remove or reduce a gap in a knee joint, rotate the hip stabilize pronation of the foot or to align the ankle or lower spine, for example. It will be appreciated that the foot can be rotated by the foot alignment tool 1, and also translated under the natural motion of the foot under rotation, so as to simply stabilize the pronation of the foot or, for example, a gap in a knee joint or the ankle.

As described further below in respect of the use of the preferred embodiments of the foot alignment tool 1, the foot 2 is rotated by the tool 1, and also naturally translated by the mechanics of the foot under the rotation from the foot alignment tool, so that the foot can be substantially aligned in a line extending between the anterior bisection of the talus and the midpoint between the first and second metatarsal adjacent the toes of the foot 2. More preferably, the foot is rotated so as to also substantially align the foot 2 with the anterior of the tibia intermediate the ankle and the knee.

The foot alignment tool 1 includes a support lever engagement means 8 which is disposed at the end of the foot alignment tool 1 at a distal end of the lever support 4. The lever support engagement means 8 is configured to extend downwardly away from the support lever 4 so as to engage a foot support surface 9. The foot support surface 9 is most preferably configured to retain the support lever engagement means 8 during rotation of the foot alignment tool 1, and also during any natural translation of the foot 2 as a result of the applied force of rotation by the foot alignment tool 1.

As noted below, in the method of use of the foot alignment tool 1, a vertically downward force is preferably applied to an upper side 10 of the foot 2 to stabilize its position during its engagement with the foot alignment tool 1. It will be appreciated that although the foot alignment tool 1 is described above as being received under or substantially under the medial longitudinal arch 5 of the foot 2, it may be received under or substantially under the navicular of the medial longitudinal arch, or the medial, intermediate or lateral cuneiforms of the medial longitudinal arch.

The foot alignment tool 1 of the preferred embodiments is configured to be used in aligning a foot 2 in the production of a foot orthotic (not illustrated). The foot orthotic may be formed from a plaster cast, a mechanical impression in a foot support surface or from an electronic measurement of the weight and/or height distribution of the bottom of the foot or from a heated mouldable plastics material disposed under the foot when the foot alignment tool 1 is engaged with or substantially with the medial longitudinal arch 5.

Whilst the foot alignment tool 1 is configured for aligning a foot bearing a load, the foot alignment tool 1 is also applicable for use in conjunction with conventional foot alignment systems. An example of an exemplary foot alignment system is disclosed in PCT Application No. PCT/AU00/001107, the disclosure of which is incorporated herein in its entirety by cross-reference. The foot alignment system of PCT/AU00/001107 is a corrective weight bearing casting tool for the manufacture of custom orthotics. This prior art foot alignment system correctly aligns a foot allowing a foot orthotic to be fabricated. It will be appreciated that other foot alignment systems may be used but that of PCT/AU00/001107 provides a good illustrative example of use of the tool 1 with a foot alignment system.

The apparatus comprises a heel support and a front foot rest extending in a foot heel-toe axis. The heel support is mounted on a heel adjustment means arranged to simultaneously pivot the heel support about the heel-toe axis and also move the heel support transversely to heel-toe axis. Whilst the foot alignment system of this particular prior art is especially advantageous in aligning a foot for the manufacture of a foot orthotic and provides a reliable apparatus for aligning a foot and manufacturing an orthotic over what was previously known, use of the foot alignment tool 1 with such a prior art system further improves the foot alignment system operation. Of course, the foot alignment tool 1 can be used independently of any foot alignment systems.

Figure 4:
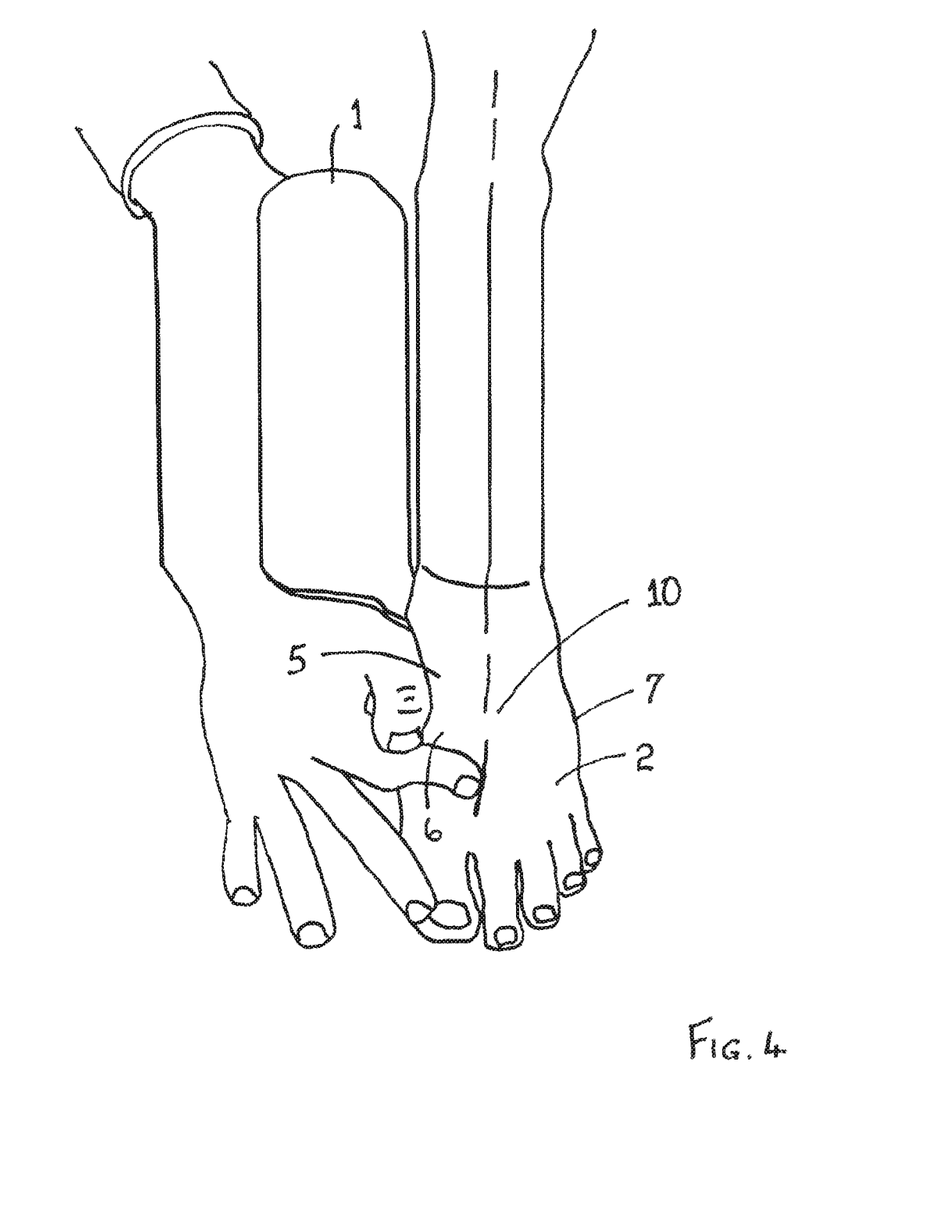
FIG. 4 is a top view of the foot alignment tool of FIG. 1 in situ under the medial longitudinal arch of the foot showing correct alignment thereof.
Figure 5:
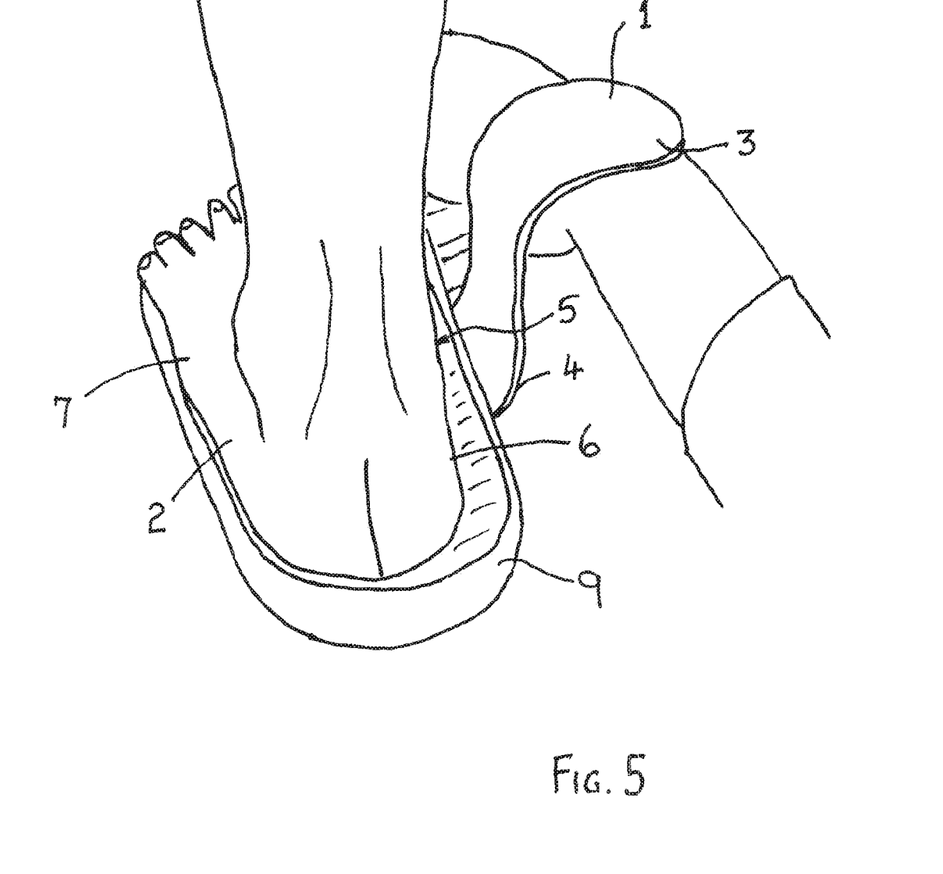
FIG. 5 is a rear view of the foot alignment tool in situ of FIG. 4.

FIG. 4 is a top view of the foot alignment tool 1 in situ under a foot 2 and with the tool 1 rotated to align the foot 2. FIG. 5 is a rear view of FIG. 4.

In a preferred embodiment in the manufacture of a foot orthotic using the foot alignment tool 1, a plaster cast or plaster bandages (not illustrated) are measured from the top of the toes of the foot 2 to the back of the heel of the foot 2. The foot alignment system mechanisms are actuated and set and a person places their foot for which the orthotic is to be made upon a foam foot support surface. The clinician or practitioner is best situated behind the person and manipulates the orientation of the foot on the foam using the foot alignment system.

Once the foot 2 is in a comfortable position, a plaster bandage is wetted and placed over the heel then both sides of the other end of the bandage are wrapped over the toes, pinched and wrapped around the sides of the foot and heel and then smoothed into the entire the foot until the plaster makes surface contact with the whole foot. The foot is guided by the clinician's hands on the foot foam and the same step is repeated for the other foot.

The next step in the process is to effect the rear foot alignment so that the foot heel axis sits in its vertically aligned position. A vertical line is then drawn on the back of the cast (or ankle as shown in FIG. 5) which is used as a reference point at the end of the casting. The clinician then performs the forefoot alignment so as to push up on the outside of the forefoot and averting it until the forefoot is maximally pronated. The clinician then checks the mobility of the first metatarsal joint by pushing lightly down on it.

The last step in the process after aligning the rear foot and forefoot is to slide the foot alignment tool 1 under or substantially under the medial longitudinal arch, for example of the left foot shown in FIGS. 4 & 5, by using the left hand so as to be disposed intermediate the medial longitudinal arch and the foot foam or foot support surface 9. In particularly preferred embodiments, a thin piece of plastic sheeting, for example PROMEG™ extruded polypropylene sheet approximately 0.6 mm thick is disposed intermediate the foot foam 9 and the underside of the foot to allow the foot alignment tool 1 to be slid under the medial longitudinal arch. As noted, the preferred embodiments of the tool 1 can be used with or without a foot alignment system.

The size and shape of the foot will determine how far into and at what angle the foot alignment tool 1 is positioned. In the embodiments of FIGS. 1 to 3, the total length of the foot alignment tool 1 is approximately 18 cm with the handle having an extent of approximately 9.5 cm and the support lever 4 having an extent of approximately 8 cm. In the embodiment of FIG. 3, the width of the support lever 4 is greater than that of the handle 3.

In the preferred embodiments shown in FIGS. 1 to 3 the foot alignment tool 1 is slightly S shaped and the support lever 4 may be likened in shape to a spade. In use, the foot alignment tool 1 once disposed under or substantially under the medial longitudinal arch 5 has a force exerted on it by a clinicians left hand when aligning a right foot 2 to push the handle 3 of the tool 1 upwardly and inwardly until the medial longitudinal arch or mid-foot is in line with the ankle joint.

The easiest manner in which to achieve this alignment is to use substantially straight lines that have been placed on the foot as an indicator of when the foot is aligned with the leg. These lines are seen at the front in FIG. 4 and on the rear in FIG. 5. The lines are preferably done at the examination stage by a clinician and, for the front line, by putting a dot about half way up on the most anterior aspect of the tibia, at the end of the tibia and between the first and second metatarsals. All three lines are joined up and another line is drawn across the ankle joint. These lines will give the clinician a clearer indication of how the foot is functioning in relation to the leg subsequent to alignment using the foot alignment system of the prior art and the foot alignment tool 1.

At this stage, the plaster bandage cast should be set and the foot (the right foot as describe above) ready to remove from the cast. With the right hand holding the back of the inside of the cast down and the wrist of the left hand pushing up and in with the fingers of the left hand pushing down gently on the first metatarsal. When the rear foot, mid foot and forefoot are all in alignment, the patient is asked to lift up their heel and out of the cast, put weight onto the ball of the big toe and pull their foot back and out of the cast. The cast is removed from the foot foam or foot support surface and the patient puts their foot back onto the foam. The same is repeated for the left foot with the only difference being that the opposite hand is used by the clinician for correction and removal of the cast.

If there is a difference in the way the reading of the cast turns out because of the movement in the plaster or an error in the way the foot was removed from the cast, it is now, while the plaster is still malleable, that the heel can be manipulated back to the same position it was when the patient was standing. This is done by holding the heel of the cast and turning it from the bottom until the line at the rear foot is substantially straight.

As described above, the foot alignment tool 1 whether used with the medial ligament arch or cuboid can be used in conjunction with a foot alignment system. The foot alignment system has the ability to align the rear foot and forefoot of a patient while the patient stands on foot foam templates that have a contoured foot shape. Plaster bandage or low temperature moulding thermoplastic is applied to the feet and the feet are placed back onto the foam. Once the desired correction is obtained and the plaster bandage or thermoplastic is set, the feet are removed and an orthotic innersole is made from these negative moulds which are turned into positive moulds of the corrected foot position. If a thin heat resistant sock is worn, thermoplastics which have an orthotics innersole shape can be applied to the feet, corrected and dispensed in the same day.

When the foot alignment tools 1 are used with the foot alignment system or on their own, the thin, smooth plastic layer as described above is glued to the undersurface of the foam. If the foot alignment tool 1 is used on the medial longitudinal arch or the cuboid with the foot alignment system, the same process is used to take a mould or produce a corrected orthotic where plaster bandage, low temperature heating thermoplastic, thermoplastic sheet or thermoplastic orthotic template, that has been heated. After correction or alignment of the rear foot and forefoot, the foot alignment tool 1 is slid in and positioned under the medial ligament arch. If the right foot is being adjusted, the practitioner's left hand will move the handle of the foot alignment tool 1 to position and feel the appropriate force and angle, before keeping the foot alignment tool 1 in place with a medium density triangular wedge.

This is done by holding the curve handle in place and inserting the wedge so it stops the foot alignment tool 1 moving. The same process is used for the cuboid region of the foot except the practitioner's right hand slides the end of the device under the cuboid and lateral column of the foot. A thin natural rubber sheet is glued to the undersurface of the wedge so it won't slide back out, laterally-away from the foot, because of the weight and force exerted on the foot alignment tool 1.

If a foot alignment system is not used with the foot alignment tool 1, the same process applies but there are no forefoot and rear foot curves, height adjustment or tilt at the heel. A mould is still taken but only the foot alignment tool 1 is used to align the foot.

It can therefore be seen that not only can the heel and forefoot alignment be achieved by use of a conventional foot alignment system for use in the manufacture of orthotics, the foot alignment tool 1 can be used to rotate and/or translate the medial longitudinal arch form of a foot. That is, all three segments of a foot can be rotated and translated so as to be aligned for manufacture of foot orthotics if desired or only the medial longitudinal arch when using tool 1 in absence of a foot alignment system.

The foot alignment tool 1 whether for use with the medial longitudinal arch or the cuboid (a small bone on the lateral side of the foot) as described below, is a tool or apparatus that has the ability to place vertical, translational and rotational forces on the medial longitudinal arch and Cuboid bone (including the rest of the lateral column: Lateral Cuneiform and Styloid Process of the $5^{th}$ Metatarsal bone) to support and stabilize the foot when weight bearing. It will be appreciated that the shape and size of the foot alignment tool 1 can vary but the movement is constant and variation will occur, depending on the amount of force applied to the tool 1.

Further, the angle at which the foot alignment tool 1 is slid under both the medial longitudinal arch and cuboid can vary dependent of the size of the foot and the amount of force which is required to be applied to the medial longitudinal arch or cuboid (lateral column) of the foot to achieve a desired result. That is, the length inserted under the foot and/or the dimensions of the tool 1 are increased in cases where rotation &/or translation is resisted by a person's physiological structure or due to body mass. For example, where the range of movement about the sub-talor joint axis is limited.

Although not illustrated, another preferred embodiment of the foot alignment tool 1 can be provided to be disposed under or adjacent the cuboid. In this embodiment of the foot alignment tool 1, the handle 3 and support lever 4 are shorter and narrower than those of the foot alignment tool 1 of FIGS. 1 to 3 given the dimensions of the foot at the cuboid compared with the medial longitudinal arch. The handle 3 of the foot alignment tool 1 of this unillustrated preferred embodiment is preferably greater than 5 cm length and a support lever 4 length of at least 3 cm.

The foot alignment tool 1 of this unillustrated embodiment is configured to be disposed under or substantially under the cuboid bone of the foot 2 as opposed to the medial longitudinal arch of the first preferred embodiment. The cuboid bone is a small bone that sits in front of the calcaneus on the lateral side of the foot. The use of the foot alignment tool 1 under a cuboid bone can be used to rotate and/or translate the foot from the outside 7 of the foot 2 to the inside 6 of the foot 2 about the heel-toe axis so as to stabilize the lateral side of the foot. This is particularly advantageous for patients that have lateral instability or a supinated foot.

As noted above the foot alignment tool 1 can be used as an independent tool to align the foot in the absence of any conventional or other foot alignment system. In the case of no use of a conventional foot alignment system, the foot alignment tool 1 can be used by filing back the portion of the foot foam 9 that normally takes the shape of the rear foot. The same foot support surface 9 plastic sheet material is disposed intermediate the bottom of the foot and the foot support surface 9 is used if desired. The same procedure as above for use with the embodiments of the foot alignment tool 1 in FIGS. 1 to 3 as would be used for the unillustrated embodiment of the foot alignment tool 1. The difference in the use is that no rear foot or forefoot alignment mechanisms are used to place forces on those areas of the foot. The foot alignment is corrected through the use of the foot alignment tool 1 disposed under or substantially under the cuboid.

It will be appreciated that a pair of foot alignment tools can be used to simultaneously rotate and/or translate the foot from under or substantially under the medial longitudinal arch and cuboid. This arrangement would in combination with a conventional foot alignment system provide all the necessary degrees of freedom of movement of the foot for alignment in making orthotics.

It will be appreciated that the foot alignment tool 1 can be of any preferred dimensions to allow a clinician to dispose the tool under or substantially under a medial longitudinal arch or cuboid. Further, whilst the embodiment of the tool 1 shown in the drawings is S-shaped, the tool 1 need not be and it will be appreciated that any preferred shape can be used and this need not be formed from a planar or substantially planar material.

The foot alignment tool 1 for use with the medial ligament arch is preferably larger, approximately 4 to 5 times, than the foot alignment tool 1 for use with the cuboid. The angle and depth of the curve of the foot alignment tool 1, distance placed or slid under the medial ligament arch or cuboid (including the lateral column), how they sit under the foot and the amount of force applied to them to achieve translation, rotation and vertical force to re-position and align the foot can vary with different foot shapes and sizes.

The foot alignment tool 1 may be substituted by a mechanical equivalent. Mechanical apparatus could be used to raise and push up on the outside, undersurface of the foot with screw designs or electro-mechanical devices use to automate the motion of the foot alignment tool 1 as described above. Scales and pressure plates can be placed under the foot foams to measure uneven weight distribution and pressure between the left and right feet. The negative models produced from a foot alignment system with the foot alignment tool 1 or negative models produced with the foot alignment tool 1 just with the foot foams form the basis to manufacture a custom foot orthotic insert.

When using the foot alignment system with the foot alignment tool 1, the rear foot platforms can be raised and tilted to mimic the position of the feet in a heeled boot or ladies fashion shoe, for example, to make a foot orthotic.

Figure 6:
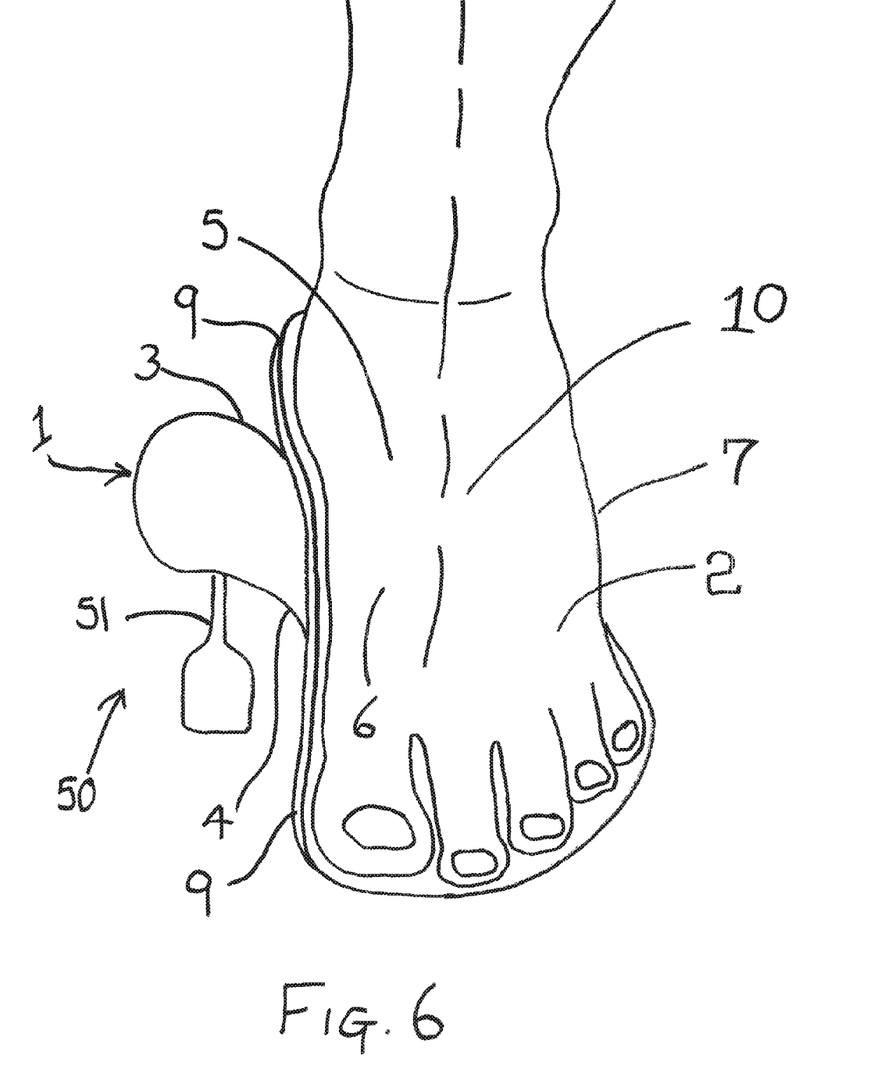
FIG. 6 is a top view of a mechanical foot alignment apparatus according to another preferred embodiment.

Referring to FIG. 6, there is shown a top view of the mechanical foot alignment apparatus 50. This embodiment is similar to that of FIG. 4 except that the handle end 3 of the foot alignment tool 1 is replaced by an outer end. The apparatus 50 includes a mechanical apparatus 51 which is configured to move to rotate and/or translate the foot alignment tool 1 to correct the position of the foot so that the thermo-plastic sheets can be shaped to fit the corrected foot position rather than the uncorrected foot position. As noted above, the mechanical apparatus 51 may rotate and/or translate the foot alignment tool to align with a line extending between the anterior bisection of the talus and the midpoint between the first and second metatarsals adjacent the toes of the foot, aligned with the anterior of the tibia intermediate the ankle and the knee and/or translate and/or rotate the foot alignment tool about the heel-toes axis into a supinated position or less pronated position.

In exactly the same manner as shown in FIG. 6, the foot alignment tool can be received under or substantially under the cuboid of the foot (not illustrated). The foot alignment tool is then able to be rotated and/or translated by the mechanical foot apparatus 51 to rotate and/or translate the foot from the outside of the foot 7 to the inside of the foot 6 (opposite to that shown in FIG. 6) by a predetermined amount about the foot heel-toe axis 10. That is, the foot alignment tool 1 applies a predetermined torque by the mechanical apparatus 51 on the foot to pronate and/or stabilize the foot for the making of orthotic.

The foregoing describes only preferred embodiments of the present invention and modifications, obvious to those skilled in the art, can be made thereto without departing from the scope of the present invention.

The term "comprising" (and its grammatical variations) as used herein is used in the inclusive sense of "including" or "having" and not in the exclusive sense of "consisting only of".

While the principles of the invention have been described above in connection with preferred embodiments, it is to be clearly understood that this description is made only by way of example and not as a limitation of the scope of the invention.

The invention claimed is:

1. A method of forming a corrective foot orthotic for a foot of a user, the foot being under a load, the method comprising the steps of:

placing the foot on a foot support surface so that the foot is under a load;

adhering at least an upper sheet and a lower sheet of thermo-formable plastic material together to form a set of thermo-formable sheets;

adhering a non-plastic sheet layer to an underside of the set of thermo-formable sheets;

heating the set of thermo-formable sheets to a predetermined temperature and then disposing the set of thermo-formable sheets intermediate the foot and the foot support surface;

before the set of thermo-formable sheets fully cools, disposing a foot alignment tool intermediate the foot support surface and the underside of the set of thermo-formable sheets so that the foot alignment tool is disposed under or substantially under a medial longitudinal arch of the foot, the foot alignment tool having an outer end and a support lever at an end opposing the outer end;

before the set of thermo-formable sheets fully cools, rotating the foot alignment tool such that a predetermined amount of torque is applied to the foot so as to translate and/or rotate the foot from an inside of the foot to an outside of the foot by a predetermined amount about a foot heel-toe axis to thereby move the foot into a corrected position;

allowing the set of thermo-formable sheets to fully cool; and adhering a top sheet layer to the set of thermo-formable sheets.

2. A method according to claim 1, wherein the step of rotating the foot alignment tool such that a predetermined amount of torque is applied to the foot further comprises at least one of the following:

translating or rotating the foot so as to substantially align the foot with an anterior of a tibia of the user intermediate an ankle and a knee of the user; translating or rotating the foot about the heel-toe axis into a supinated position or a less pronated position; translating or rotating the foot so as to be substantially aligned with a line extending between an anterior bisection of a talus bone and a midpoint between first and second metatarsals adjacent toes of the foot; and translating or rotating the foot so as to remove a gap in a knee joint, rotate a hip, stabilize pronation of the foot, or properly align the ankle or a lower spine of the user.

3. A method as defined in claim 1, further comprising reinforcing at least one of the upper sheet and the lower sheet.

4. A method as defined in claim 1, wherein the step of rotating the foot alignment tool is performed by a mechanical apparatus or a handle of the foot alignment tool that is located at the outer end thereof.

5. A method according to claim 1, further comprising disposing a foot foam intermediate the foot and the foot support surface such that the foot alignment tool is disposed under the foot foam.

6. The method as defined in claim 5, further comprising wrapping a wrap around the foot while it is located on the foot foam to secure the foot to the foot foam.

7. A method as defined in claim 1, further comprising applying a downward vertical force to an upper side of the foot to stabilize its position during the step of rotating the foot alignment tool such that a predetermined amount of torque is applied to the foot.

8. A method as defined in claim 1, wherein the step of disposing a foot alignment tool intermediate the foot support surface and the underside of the set of thermo-formable sheets so that the foot alignment tool is disposed under or substantially under the medial longitudinal arch of the foot further comprises disposing a foot alignment tool that is substantially S-shaped in cross-section intermediate the foot support surface and the underside of the set of thermo-formable sheets.

9. A method of forming a corrective foot orthotic for a foot of a user, the foot being under a load, the method comprising the steps of:
  placing the foot on a foot support surface so that the foot is under a load;
  adhering at least an upper sheet and a lower sheet of thermo-formable plastic material together to form a set of thermo-formable sheets;
  adhering a non-plastic sheet layer to an underside of the set of thermo-formable sheets;
  heating the set of thermo-formable sheets to a predetermined temperature and then disposing the set of thermo-formable sheets intermediate the foot and the foot support surface;
  before the set of thermo-formable sheets fully cools, disposing a foot alignment tool intermediate the foot support surface and the underside of the set of thermo-formable sheets so that the foot alignment tool is disposed under or substantially under a cuboid bone of the foot, the foot alignment tool having an outer end and a support lever at an end opposing the outer end;
  before the set of thermo-formable sheets fully cools, rotating the foot alignment tool such that a predetermined amount of torque is applied to the foot so as to translate and/or rotate the foot from an inside of the foot to an outside of the foot by a predetermined amount about a foot heel-toe axis to thereby move the foot into a corrected position;
  allowing the set of thermo-formable sheets to fully cool; and
  adhering a top sheet layer to the set of thermo-formable sheets.

10. A method according to claim 9, wherein the step of rotating the foot alignment tool such that a predetermined amount of torque is applied to the foot further comprises at least one of the following:
  translating or rotating the foot so as to substantially align the foot with an anterior of a tibia of the user intermediate an ankle and a knee of the user; translating or rotating the foot about the heel-toe axis into a supinated position or a less pronated position; translating or rotating the foot so as to be substantially aligned with a line extending between an anterior bisection of a talus bone and a midpoint between first and second metatarsals adjacent toes of the foot; and translating or rotating the foot so as to remove a gap in a knee joint, rotate a hip, stabilize pronation of the foot, or properly align the ankle or a lower spine of the user.

11. A method as defined in claim 9, further comprising reinforcing at least one of the upper sheet and the lower sheet.

12. A method as defined in claim 9, wherein the step of rotating the foot alignment tool is performed by a mechanical apparatus or a handle of the foot alignment tool that is located at the outer end thereof.

13. A method according to claim 9, further comprising disposing a foot foam intermediate the foot and the foot support surface such that the foot alignment tool is disposed under the foot foam.

14. The method as defined in claim 13, further comprising wrapping a wrap around the foot while it is located on the foot foam to secure the foot to the foot foam.

15. A method as defined in claim 9, further comprising applying a downward vertical force to an upper side of the foot to stabilize its position during the step of rotating the foot alignment tool such that a predetermined amount of torque is applied to the foot.

16. A method as defined in claim 9, wherein the step of disposing a foot alignment tool intermediate the foot support surface and the underside of the set of thermo-formable sheets so that the foot alignment tool is disposed under or substantially under the cuboid bone of the foot further comprises disposing a foot alignment tool that is substantially S-shaped in cross-section intermediate the foot support surface and the underside of the set of thermo-formable sheets.

* * * * *